(12) United States Patent
Guck et al.

(10) Patent No.: US 12,381,866 B2
(45) Date of Patent: Aug. 5, 2025

(54) SECURE TRANSFER OF ACCESS CREDENTIALS

(71) Applicant: Target Brands, Inc., Minneapolis, MN (US)

(72) Inventors: Andrew Guck, Plymouth, MN (US); Carolina Clement, Maple Grove, MN (US); Emma Matthies, Brooklyn Park, MN (US); Manish Kumar Khedawat, Rajasthan (IN); Dustin Gundrum, Blaine, MN (US); Joshua Scott Jenquist, Golden Valley, MN (US)

(73) Assignee: Target Brands, Inc., Minneapolis, MN (US)

( * ) Notice: Subject to any disclaimer, the term of this patent is extended or adjusted under 35 U.S.C. 154(b) by 133 days.

(21) Appl. No.: 18/521,563

(22) Filed: Nov. 28, 2023

(65) Prior Publication Data

US 2025/0175459 A1    May 29, 2025

(51) Int. Cl.
*H04L 29/06* (2006.01)
*H04L 9/08* (2006.01)
*H04L 9/40* (2022.01)

(52) U.S. Cl.
CPC ........ *H04L 63/0807* (2013.01); *H04L 9/0825* (2013.01); *H04L 63/083* (2013.01)

(58) Field of Classification Search
CPC ... H04L 63/0807; H04L 63/08; H04L 9/0825; H04L 9/0816; H04L 63/0853; H04L 63/083; H04W 12/06; H04W 12/08; H04W 12/068
See application file for complete search history.

(56) References Cited

U.S. PATENT DOCUMENTS

| | | | |
|---|---|---|---|
| 10,581,810 B1 | 3/2020 | Gehret et al. | |
| 11,374,931 B2 | 6/2022 | Cheng | |
| 11,605,070 B2 | 3/2023 | D'Agostino et al. | |
| 11,658,961 B2 | 5/2023 | Ebrahimi et al. | |
| 2004/0089249 A1* | 5/2004 | Jovanovic | F02D 41/3058 123/305 |
| 2013/0111208 A1 | 5/2013 | Sabin et al. | |
| 2013/0173915 A1 | 7/2013 | Haulund | |

(Continued)

FOREIGN PATENT DOCUMENTS

WO    WO-2022046165 A1 *    3/2022

*Primary Examiner* — Yogesh Paliwal
(74) *Attorney, Agent, or Firm* — Barnes & Thornburg LLP

(57) ABSTRACT

In some implementations, a system is provided for securely transferring access credentials from a mobile device that is exclusively operated by a single user, to a terminal device that is shared among multiple different users, via a session server. A session is established between the session server and the terminal device over a secure communication channel. The terminal device generates a key pair, transmits the public key to the session server, and stores the private key. The terminal device outputs a detectable code corresponding to the session. In response to detecting the detectable code, the mobile device transmits an access token payload to the session server. The session server transmits, to the terminal device, an encrypted access token that has been encrypted using the public key. The terminal device decrypts the encrypted access token using the stored private key, and provides operator access to the terminal device.

20 Claims, 12 Drawing Sheets

(56) References Cited

U.S. PATENT DOCUMENTS

| | | | |
|---|---|---|---|
| 2013/0263211 A1* | 10/2013 | Neuman | H04L 63/083 |
| | | | 726/1 |
| 2019/0313470 A1 | 10/2019 | Milligan et al. | |
| 2020/0127832 A1* | 4/2020 | Ebrahimi | H04L 63/0815 |
| 2020/0233949 A1* | 7/2020 | Xia | H04W 12/08 |
| 2021/0135868 A1* | 5/2021 | Oosthuizen | H04L 9/0863 |
| 2022/0303268 A1 | 9/2022 | Karnaros et al. | |
| 2022/0345297 A1 | 10/2022 | Barbir et al. | |
| 2023/0254164 A1* | 8/2023 | Sampath | G09C 5/00 |
| | | | 713/168 |

* cited by examiner

SECURE TRANSFER OF ACCESS CREDENTIALS

TECHNICAL FIELD

This specification generally relates to a platform for providing a secure transfer of access credentials from a mobile computing device to a terminal computing device, for example, using cryptographic techniques.

BACKGROUND

Access tokens can be used in token-based authentication environments to allow an application to access various computing services. After a successful user authentication, an access token that encapsulates the user's credentials can be provided to the application. The application can then use the access token to call the application programming interfaces (APIs) of the computing services. Access tokens can be provided to client devices upon verification of a corresponding user's credentials (e.g., username and password), and can be used by the client device to permit ongoing authorized access, such as over a communication session with a system that restricts access to only authorized users, without requiring repeated validation of the corresponding user's credentials. Access tokens may expire after a period of time, after which a user would be required to re-validate their credentials in order to receive a new access token for continued access.

SUMMARY

This document generally describes computer systems, processes, program products, and devices for providing a secure transfer of access credentials from a mobile computing device to a terminal computing device, using cryptographic techniques. In general, a computing device can include a login interface through which a user can provide login credentials in order to access the device. However, in the case of a publicly accessible computing device (e.g., a terminal device such as a kiosk, a point of sale (POS) device, etc.), a malicious actor can potentially harvest another user's login credentials (e.g., by observing the user as login credentials are being entered), and can employ the user's login credentials to log in to the publically accessible computing device (or a similar device) at a later time. In a login operation that is facilitated by the presently described technology, a terminal device can output a detectable code (e.g. a scannable barcode displayed on its screen), and a user who intends to log in to the terminal device can use their personal mobile device (to which the user may already be logged in) to scan the detectable code. Upon scanning the code, the mobile device sends its access credentials (e.g., one or more access tokens) to a session server, which then forwards the access credentials in an encrypted state to the terminal device that had output the scanned code. The terminal device then decrypts the received access credentials and uses the credentials to log the user in to the terminal device.

The technology described in this document uses public/private key encryption, with a public/private key pair being generated by the terminal device, and the public key being sent by the terminal device to the session server for use in encrypting the user's access credentials. Thus, the access credentials are not stored in plaintext form, nor do they exist in plaintext form during transfer between the session server and the terminal device. Additionally, by the terminal device generating the public/private key pair and securely retaining the private key as a secret that is only known to the terminal device (e.g., with the private key not being exposed to or transmitted to any other devices), the access token encrypted with the public key can only be decrypted by the terminal device. As a result, attempts by any malicious actors to use the scannable code presented on the terminal device, to intercept the encrypted access token, or to otherwise inject malicious actions into the secure access token transfer process described throughout this document will be rendered ineffective and inconsequential. Retention of the private key by the terminal device permits for only the terminal device to decrypt and use the access token, which can readily be validated and verified through secure communication with an authentication server that originally generated and provided the access token to the mobile device.

Various additional security features can also be provided by the described technology, such as a two-stage transfer protocol between the mobile device and the session server, in which the mobile device requests the public key from the session server and performs an additional layer of encryption of the credentials, rather than session server performing the encryption. Another security feature that can be provided is a periodic refreshing of the scannable code output by the terminal device, while maintaining an association to an open session between the terminal device and the session server. Another security feature that can be provided is a check of the scannable code by the mobile device, and a presentation of a confirmation control by the mobile device in response to a detection of a code that can potentially trigger an automated login process. These additional security features can help thwart possible replay attacks by malicious actors. Also, security features can be provided for thwarting attempts by malicious actors to log in to a terminal device by gaining access to an unattended mobile device, including control logic that prompts a mobile device login process when detecting unexpected device use.

In some implementations, a method for securely transferring access credentials from a mobile device that is exclusively operated by a single user, to a terminal device that is shared among multiple different users, via a session server, includes transmitting, by the session server and to the terminal device over a secure communication channel, a session identifier of a session; generating, by the terminal device, a key pair comprising a private key and a public key; transmitting the public key, by the terminal device and to the session server over the secure communication channel, and storing, at the terminal device, the private key; outputting, by the terminal device, a detectable code corresponding to the session identifier, in a format that is configured for detection by the mobile device; detecting, by the mobile device, the detectable code that has been output by the terminal device; in response to detecting the detectable code, transmitting, by the mobile device and to the session server, an access token payload in association with the detectable code; transmitting, by the session server and to the terminal device over the secure communication channel, an encrypted access token that has been encrypted using the public key that had previously been transmitted by the terminal device; decrypting, by the terminal device, the encrypted access token using the stored private key; and providing operator access to the terminal device.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. A request for an access token can be transmitted by the mobile device and to an authentication server. The request for the access token can include login credentials of a user of the mobile device. The access token can be received by the mobile device and from the authentication in response to the request. After receiving the access token, a timer can be started for the mobile device. After starting the timer for the mobile device, a scan of a detectable code that is being output by the terminal device can be detected by the mobile device. A determination can be performed of whether the timer has expired. In response to determining that the timer has expired, the mobile device can present a login interface for initiating another request for the access token from the authentication server. A session creation request can be received by the session server and from the terminal device. In response to receiving the session creation request, the session can be created by the session server. The session can include the secure communication channel between the session server and the terminal device. The session server can generate the session identifier of the session. The session identifier can be a universally unique identifier. The session server can periodically generate an updated code that corresponds to the session identifier. The session server can transmit the updated code to the terminal device over the secure communication channel. The terminal device can output an updated detectable code that corresponds to the session identifier, in a format that is configured for detection by the mobile device. Transmitting the access token payload can include transmitting the access token payload to an address at the session server that corresponds to the detectable code. An access token of the mobile device can be added to the access token payload, by the mobile device. After receiving the access token payload, the access token can be extracted from the access token payload by the session server. The session server can encrypt the access token using the public key that had previously been transmitted by the terminal device, to generate the encrypted access token. A request for the public key that had previously been transmitted by the terminal device can be received by the session server and from the mobile device. In response to the request for the public key, the public key can be transmitted from the session server to the mobile device. After receiving the public key, the access token can be encrypted, by the mobile device and using the public key, to generate the encrypted access token. The encrypted access token can be added to the access token payload by the mobile device. The encrypted access token included in the access token payload can be generated, by encrypting the access token using a symmetric key, and encrypting the symmetric key with the public key that had previously been transmitted by the terminal device. The encrypted symmetric key can be transmitted along with the encrypted access token, by the session server and to the terminal device over the secure communication channel. Decrypting the encrypted access token, by the terminal device and using the stored private key can include decrypting the encrypted symmetric key using the stored private key, and decrypting the encrypted access token using the decrypted symmetric key.

The systems, devices, program products, and processes described throughout this document can, in some instances, provide one or more of the following advantages. An interactive communication session can be established between a terminal device and a session server, through which data can be transmitted and received without polling. The interactive communication session can use a secure communication channel to provide a degree of security for data being transmitted, such that a possible listener on the secure communication channel is unable to decipher the data. By employing an additional layer of security (e.g., asymmetric encryption) in addition to the security provided by the communication channel established between the terminal device and the session server, data can be secured both in transit and at rest. The automated and secure transfer of credentials from a mobile device to a terminal device can expedite a login process by reducing the amount of friction encountered by a user during the process (e.g., the manual entry of login information). Further, an automated login process for the terminal device can be preferable to a manual login process, in that a malicious actor can be prevented from observing the user as login information is being entered at the terminal device, and then using the login information to access the terminal device at a later time. A detectable code output by a terminal device can be periodically updated to prevent possible replay attacks that could arise from outputting a code based on a static session identifier at a terminal for an extended period of time. By limiting the information included in the detectable code to code type identifiers and session identifiers, malicious actors are unable to leverage the information to obtain access tokens or to perform other malicious activities. By using a symmetric encryption protocol to encrypt an access token, and an asymmetric encryption protocol to encrypt the symmetric key, larger amounts of data can be encrypted while leveraging the security benefit of public/private key pair cryptography.

Other features, aspects and potential advantages will be apparent from the accompanying description and figures.

DESCRIPTION OF DRAWINGS

Like reference symbols in the various drawings indicate like elements.

DETAILED DESCRIPTION

This document describes technology that can provide a secure transfer of access credentials from a mobile computing device to a terminal computing device via an intermediate session server, using cryptographic techniques. In a login operation that is facilitated by the presently described technology, a terminal device can output a detectable code, and a user who intends to log in to the terminal device can use their personal mobile device (to which the user may already be logged in) to scan the detectable code. Upon scanning the code, the mobile device sends its access credentials to a session server, which then forwards the access credentials in an encrypted state to the terminal device that had output the scanned code. The terminal device then decrypts the received access credentials and uses the credentials to log the user in to the terminal device.

Figure 1A:
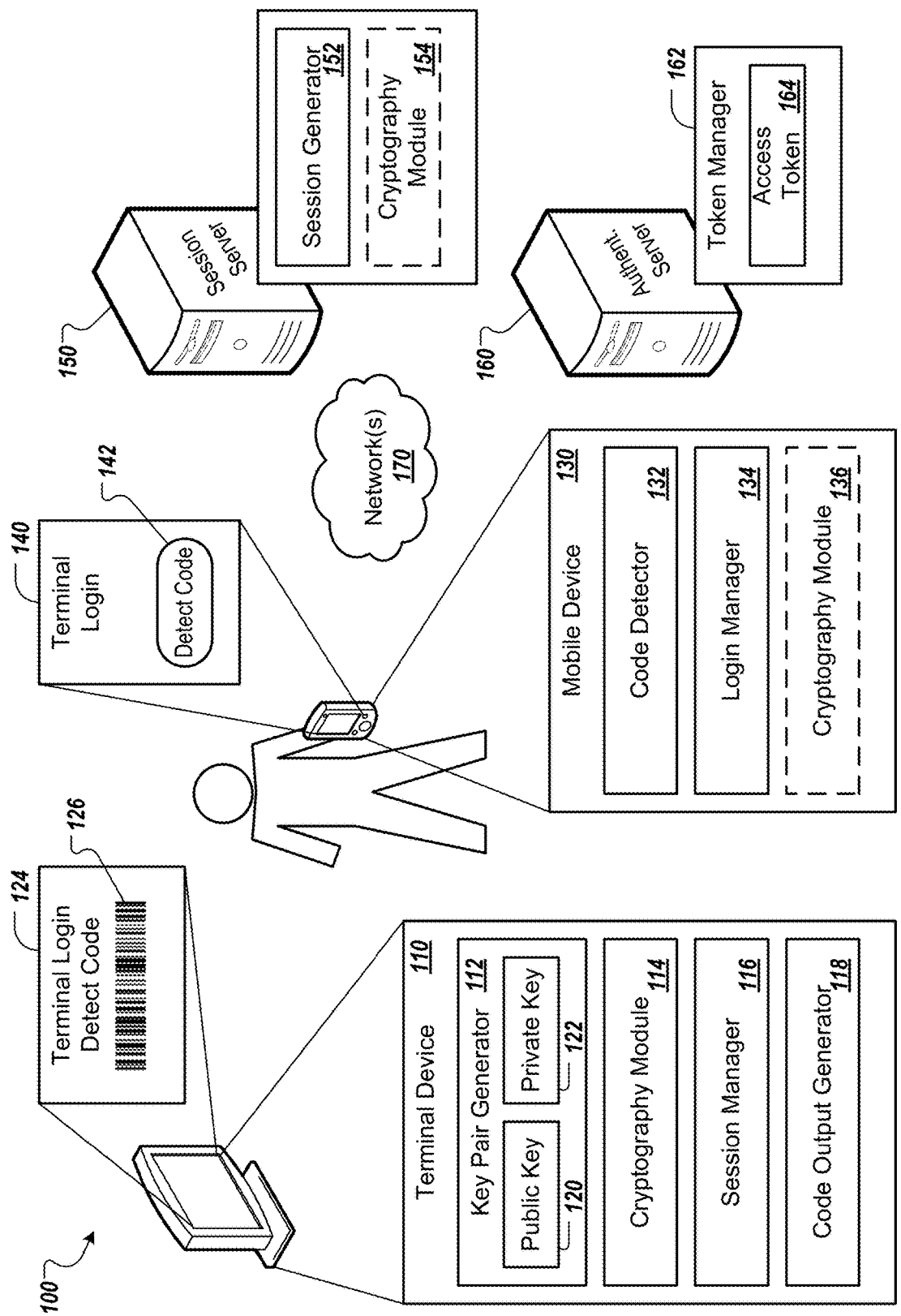
FIG. 1A depicts an example system for securely transferring access credentials.

FIG. 1A depicts an example system 100 for securely transferring access credentials. The system 100, for example, can include one or more terminal computing devices (e.g., terminal device 110), one or more mobile computing devices (e.g., mobile device 130), a session server 150, and an authentication server 160. Communication between the devices 110, 130, 150, and 160, for example, can occur over one or more communications networks 170, including a LAN (local area network), a WAN (wide area network), and/or the Internet.

The terminal device 110, for example, can represent a stationary computing device that includes one or more processors, memory, and data storage devices. For example, the terminal device 110 can include one or more input devices (e.g., touchscreens, keypads, pointers, scanners, etc.) and one or more output devices (e.g., display units, audio speakers, etc.). The terminal device 110 in the present example can also include various hardware and/or software components, including a key pair generator 112 (e.g., for generating a corresponding public key 120 and private key 122), a cryptography module 114, a session manager 116, and a code output generator 118. In general, the terminal device 110 can by shared by multiple different users. After logging into the terminal device 110, for example, a user can access the device to receive information from the device, to submit information to the device, and/or to perform operations that are supported by the device. Once the user has completed a session with the terminal device 110 (e.g., an encounter that occurs between the user and the device), the user can terminate the session, and a different user can potentially log in to the device 110 to initiate a new session. In some examples, the terminal device 110 can represent a kiosk, a point of sale (POS) device, or another sort of device that facilitates the exchange of information and/or the performance of financial transactions. Although a single terminal device 110 is shown in FIG. 1A, in some examples, multiple terminal devices 110 can be located in a building or a geographic area.

The mobile device 130, for example, can represent various forms of mobile processing devices including but not limited to a tablet computer, a personal digital assistant (PDA), a smartphone, or another sort of processing device. For example, the mobile device 130 can include one or more input devices (e.g., touchscreens, keypads, pointers, scanners, etc.) and one or more output devices (e.g., display units, audio speakers, haptic feedback mechanisms, etc.). The mobile device 130 in the present example can also include various hardware and/or software components, including a code detector 132, a login manager 134, and an optional cryptography module 136. In some examples, the mobile device 130 can be one of a set of specialized and similarly configured devices, with each device including a display, a code detection unit (e.g., an optical detection unit such as a camera, a laser scanner, etc.), and a wireless communication unit (e.g., Bluetooth, Wi-Fi, etc.). For example, multiple different users (e.g., workers for a company, or another group of individuals) can each be issued a respective mobile device 130, and each user can use their respective device to perform functions for the organization (e.g., after logging into the respective mobile device).

The session server 150 and the authentication server 160, for example, can each represent various forms of computing servers, including but not limited to network servers, web servers, application servers, or other suitable computing servers, and can each include one or more computing server devices. In some implementations, operations of the session server 150 and the authentication server 160 can be performed by a single computing server device (or a group of connected computing server devices). In some implementations, operations of the session server 150 and/or the authentication server 160 can be distributed among one or more additional computing server devices/systems. In general, the authentication server 160 can be configured to provide authentication services for the mobile device 130 (e.g., using a token manager 162 to provide an access token 164 to the mobile device 130 in response to a user login process), whereas the session server 150 can be configured to generate a new session at the terminal device 110 and to coordinate the secure transfer of user access credentials from the mobile device 130 to the terminal device 110. The access token 164, for example, can represent one or more tokens that include data related to a user of the mobile device 130 (e.g., including permissions, groups, expirations, etc.), and that can be used to verify and provide user access rights to various resources in the system 100 (e.g., including functions of the mobile device 130 and functions of the terminal device 110).

To initiate a process for securely transferring user access credentials, for example, the terminal device 110 can present a login interface 124 (e.g., through a display unit of the terminal device 110) that includes a detectable code 126. A user can log in to the terminal device 110, for example, by interacting with a corresponding terminal login interface 140 of the mobile device 130 (e.g., presented through its display unit) to trigger a detection of the detectable code 126 (e.g., by selecting a physical or virtual control 142 of the mobile device 130). As discussed in further detail in examples below, a series of coordinated actions can be performed by the terminal device 110, the mobile device, and the session server 150 (and optionally, the authentication server 160), to securely transfer the user's active access credentials (e.g., the access token 164) from the mobile device 130 to the terminal device 110, so that the user can participate in an authenticated session with the terminal device 110 without directly entering login credentials (e.g., a user name and password, a personal identification number (PIN), etc.) at the terminal device 110.

FIGS. 1B-1F depict an example illustrative process for securely transferring access credentials using the example system 100 from FIG. 1A. As part of this example illustrative process the terminal device 110 is depicted as an example Point of Sale (POS) device, such as a self-checkout POS device used within retail environments. The process depicted in FIGS. 1B-1F can be applied to and performed by other terminal devices as described throughout this document.

Figure 1B:
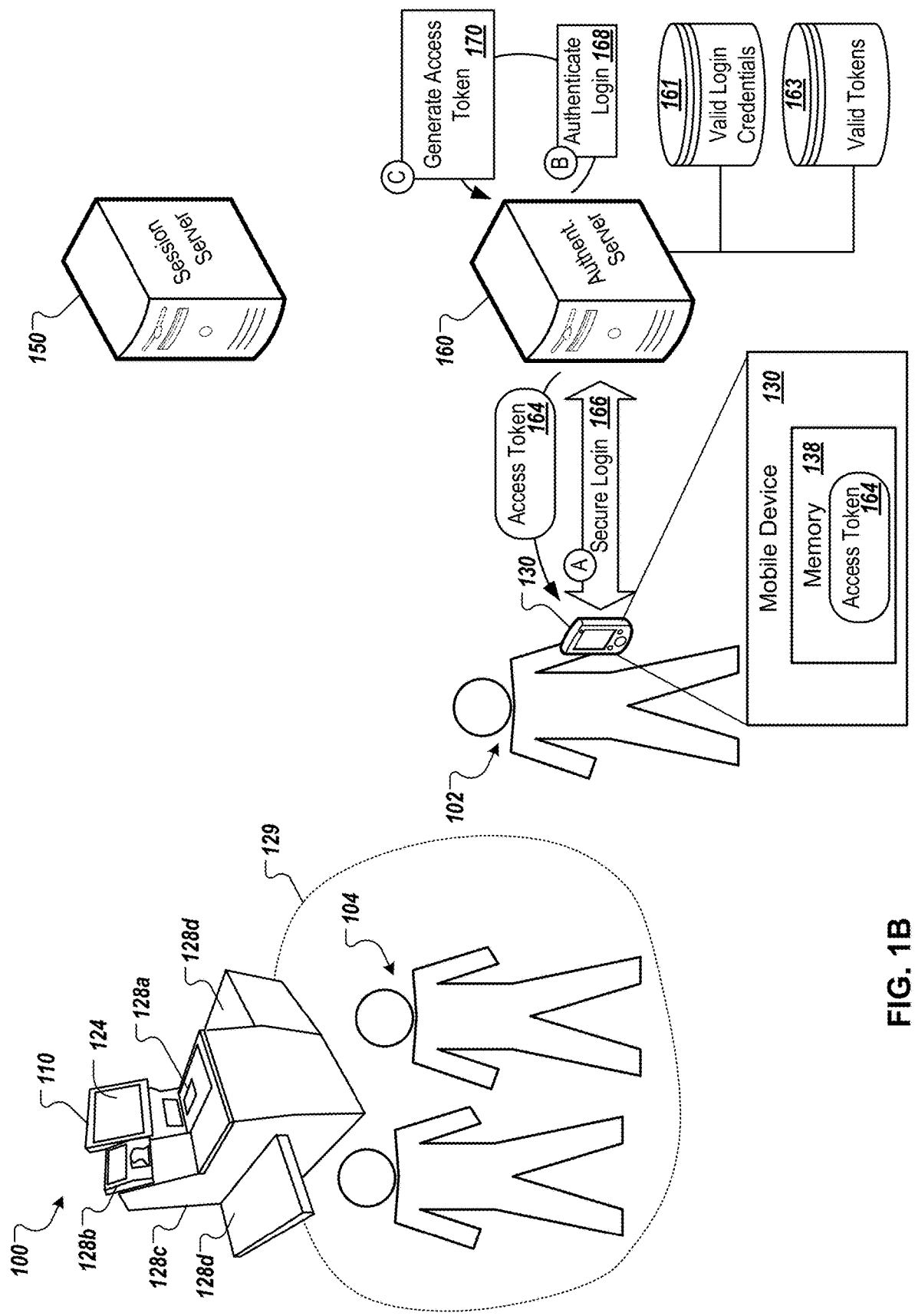
FIGS. 1B-1F depict an example illustrative process for securely transferring access credentials using the example system from FIG. 1A.

Referring to FIG. 1B, an example POS terminal device 110 includes multiple components, including the user interface 124 (e.g., touchscreen display, non-touchscreen display combined with user input device, such as a keypad or voice interface), one or more product scanners 128a to scan products as part of a checkout process, a payment terminal 128b, a terminal cabinet and/or housing 128c to which and/or within which the components are mounted, and/or one or more product or bagging areas 128*d*. Additional and/or alternative components are also possible. The POS terminal device 110 can be located in an unrestricted or publicly accessible area 129 where a user 102 with access credentials, such as employees of a retail store within which the POS terminal device 110 is located, as well as other individuals 104 without access credentials, such as guests/ customers of the retail store as well as malicious actors seeking to potentially obtain unauthorized access to restricted features on the POS terminal device 110. The POS terminal device 110 can provide a login screen, for example, on the user interface 124 through which the user 102 can enter their access credentials for validation by the authentication server 160. However, the inputs provided to the user interface 124 by the user 102 with the access credentials can be viewable to anyone within the unrestricted/publicly accessible area 129, such as the other individuals 104 who may be able to record/remember and subsequently use the access credentials to improperly gain access to restricted features on the POS terminal device 110 or other terminal devices. Such restricted features that may require authentication can include any of a variety of operations, such as voiding items from transactions and/or voiding entire transactions, processing refunds and returns, and otherwise permitting actions that should only be available to an employee, manager, or other individual trusted within the retail environment.

As discussed above, the user 102 can have a mobile device 130 that is used to perform various duties within the retail environment, such as identifying product stock levels and locations within the retail environment, restocking inventory, fulfilling pickup orders, and/or other tasks. The mobile device 130 can require the user 102 to login and validate their credentials with the authentication server 160. Such a login process on the mobile device 130 can be performed in a manner that is either private (e.g., performed in areas of retail environment only accessible to employees, such as backroom or employee only areas) or not readily viewable to other individuals 104 (e.g., performed on a smaller screen than that of the POS terminal device 110, and thus difficult or impossible for the other individuals 104 to view). As indicated by step A (166), the user 102 can perform a secure login process with the authentication server 160 at a private/secure environment within the retail environment (e.g., in a location different from the unrestricted/ publicly accessible area 129 and/or performed in manner not readily detectable by the other individuals 104). The secure login process can include the user 102 providing login credentials through the mobile device 130, which are authenticated by the authentication server 160 (step B, 168) by referencing a data repository of valid login credentials 161. Once the credentials are authenticated, the authentication server 160 can generate an access token 164 (step C, 170), which can be stored in a repository of valid tokens 163 and can also be provided to the mobile device 130. The mobile device 130 can store the access token 164 within its local memory 138, and can subsequently use the access token 164 to authorize the credentials of the user 102 with various systems and platforms within the retail environment.

Figure 1C:
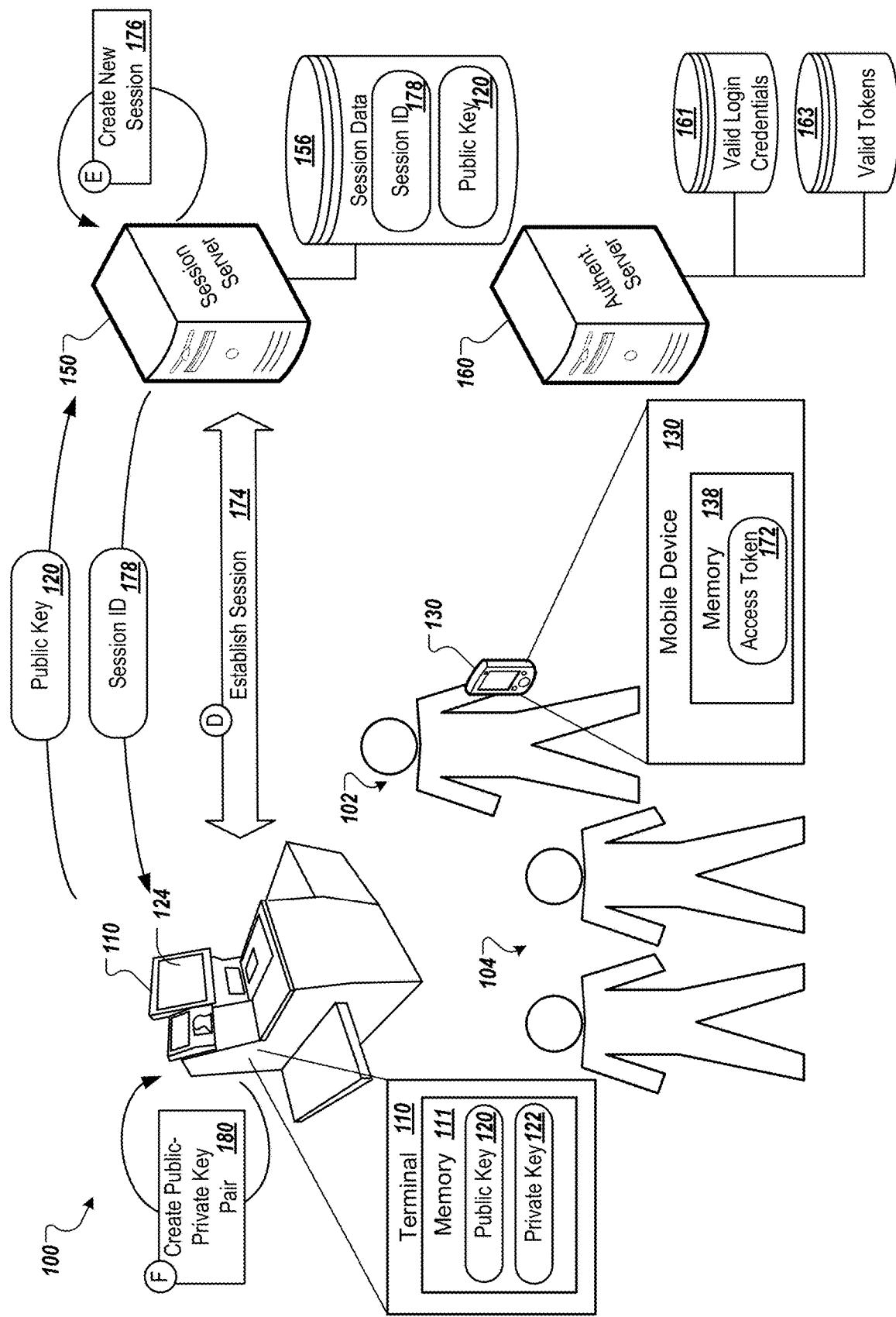

Referring to FIG. 1C, the POS terminal device 110 can establish a session with the sessions server 150, as indicated by step D (174). The session creation can be performed, for example, in response to the user 102 selecting an option for an authorized user to login to the terminal 110. Establishing the session can include the session server 150 creating a new session (step E, 176), which can include a session ID 178 that is shared with the POS terminal device 110. The POS terminal device 110 can additionally create a public/private key pair (step F, 180), which can include a pair of cryptographic keys including a public key 120 and a private key 122 that are stored in local memory 111 of the terminal device 110. Only the public key 120 can be shared by POS terminal device 110 with the session server 150, and the private key 122 can be maintained as a secret that is known only to the POS terminal device 110. The session server 150 can have a repository of session data 156, which can include the session ID 178 for the created session as well as the public key 120 created by the POS terminal device 110 that is associated with the session.

Figure 1D:
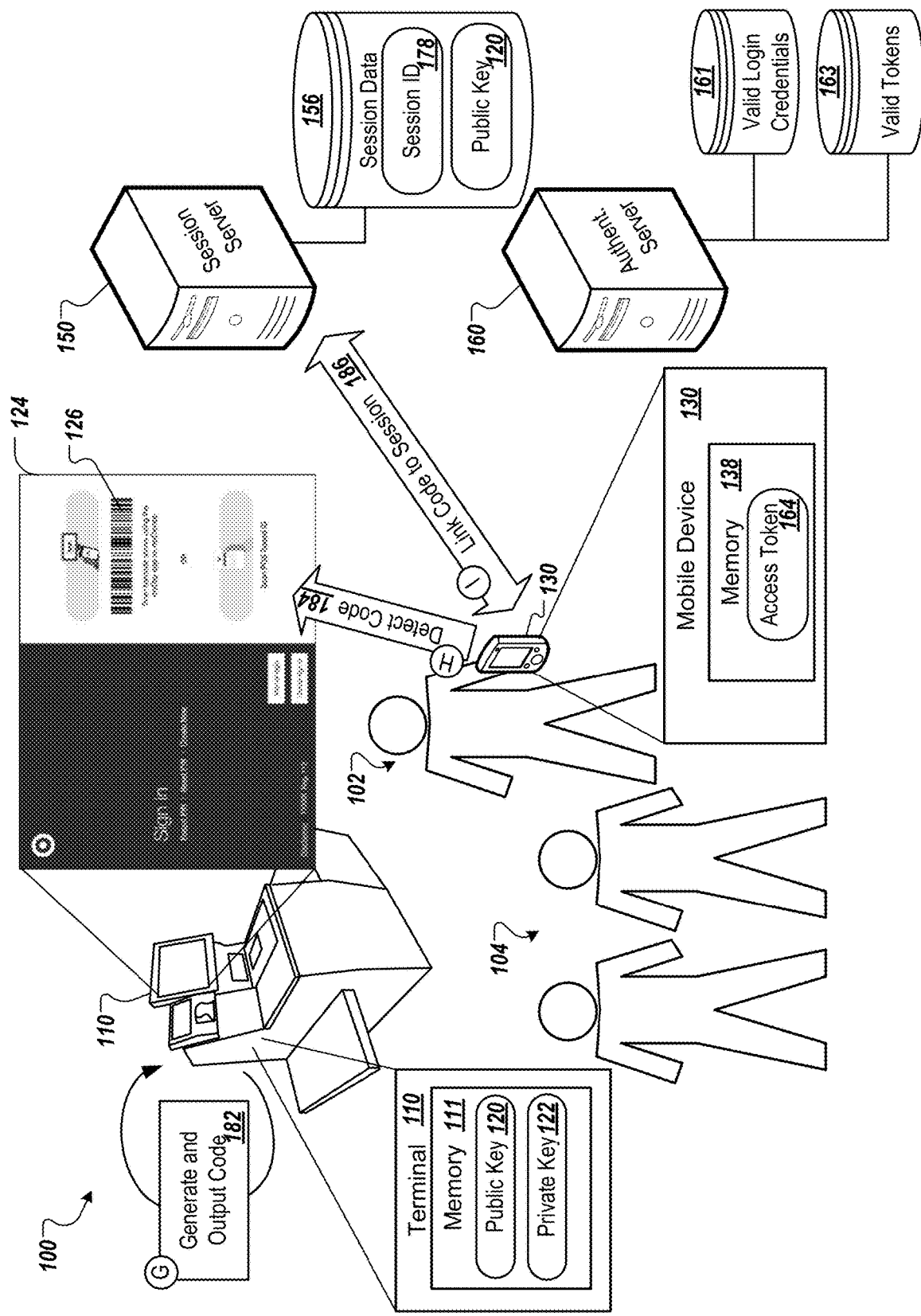

Referring to FIG. 1D, the POS terminal device 110 can generate and output a scannable code 126 in the user interface 124 using the session ID 178, as indicated by step G (182). The scannable code 126 can include information that either directly or indirectly is able to be linked to the session ID 178, such as the session ID 178 itself, a value that is derived from the session ID 178, an identifier for the POS terminal 110 that can be used by the session server 150 to lookup the session ID 178 in the session data 156, and/or other values. The scannable code 126 can be presented among multiple different techniques for the user 102 to login to the POS terminal device 110, such as a technique for entering login credentials directly. The mobile device 130 can detect the code 126 presented in the user interface 124 (step H, 184), for example, without requiring or establishing a communication pathway between the mobile device 130 and the POS terminal 110. For instance, the mobile device 130 can include a camera or other scanning device to optically detect the code 126 as visually output in the user interface 124. Other techniques for detecting the code 126 are also possible, including other optical/visual based techniques, auditory techniques, wireless transmission techniques, and/or combinations thereof. The mobile device 130 and the session server 150 can communicate to link the detected code to the session ID 178 established by the POS terminal 110 and the session server 150, as depicted in step I (186).

Figure 1E:
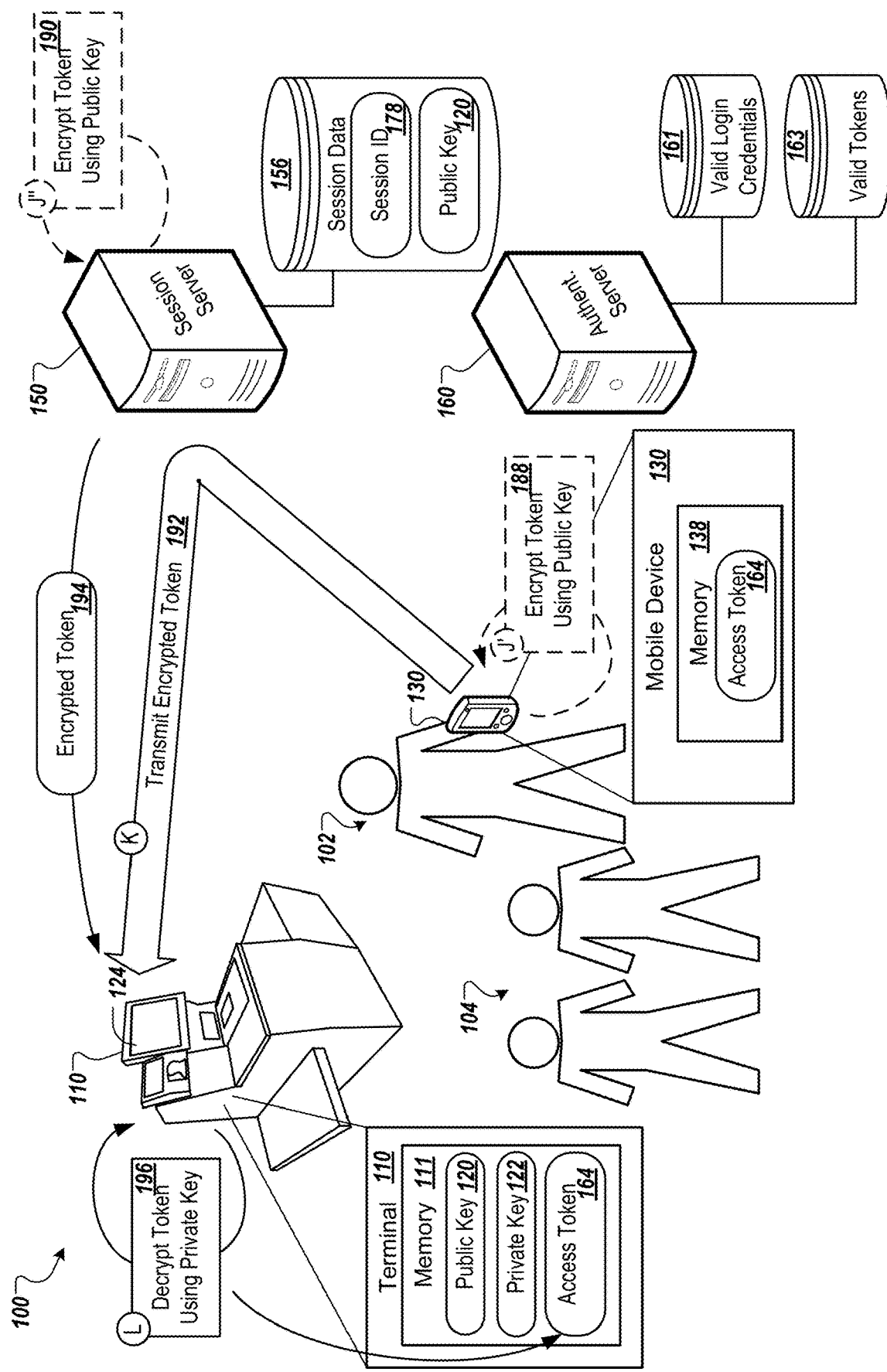

Referring to FIG. 1E, once the code 126 and the session ID 178 have been linked together by the mobile device 130 and the session server 150, the public key 120 provided to and stored by the session server 150 can be used to encrypt the access token 164 and to transmit the encrypted access token 194 to the POS terminal 110 (step K, 192). In one instance, the mobile device 130 can receive the public key 120 from the session server 150 and generate the encrypted token 194 with the locally stored access token 164 and the public key 120, as indicated by step J' (188). The encrypted token 194 can be provided by the mobile device 130 to the session server 150, and retransmitted to the POS terminal 110 as part of the session with the POS terminal device 110. In other instances, the access token 164 can be securely transmitted by the mobile device 130 to the session server 150, which can generate the encrypted token 194 using the locally stored public key 120 (step J", 190) and can transmit the encrypted token to the POS terminal 110 as part of the session with the POS terminal device 110. The POS terminal device 110 can receive and decrypt the token 194 using the private key 122 stored in memory 111, as indicated by step L (196). Decrypting the token 194 can result in the unencrypted access token 164 being securely transferred to the POS terminal device 110, which can store the access token 164 in memory 111 for use authenticating the user 102 on the POS terminal device 110 without the user 102 having to enter login credentials in a manner that may expose them to the other individuals 104.

Figure 1F:
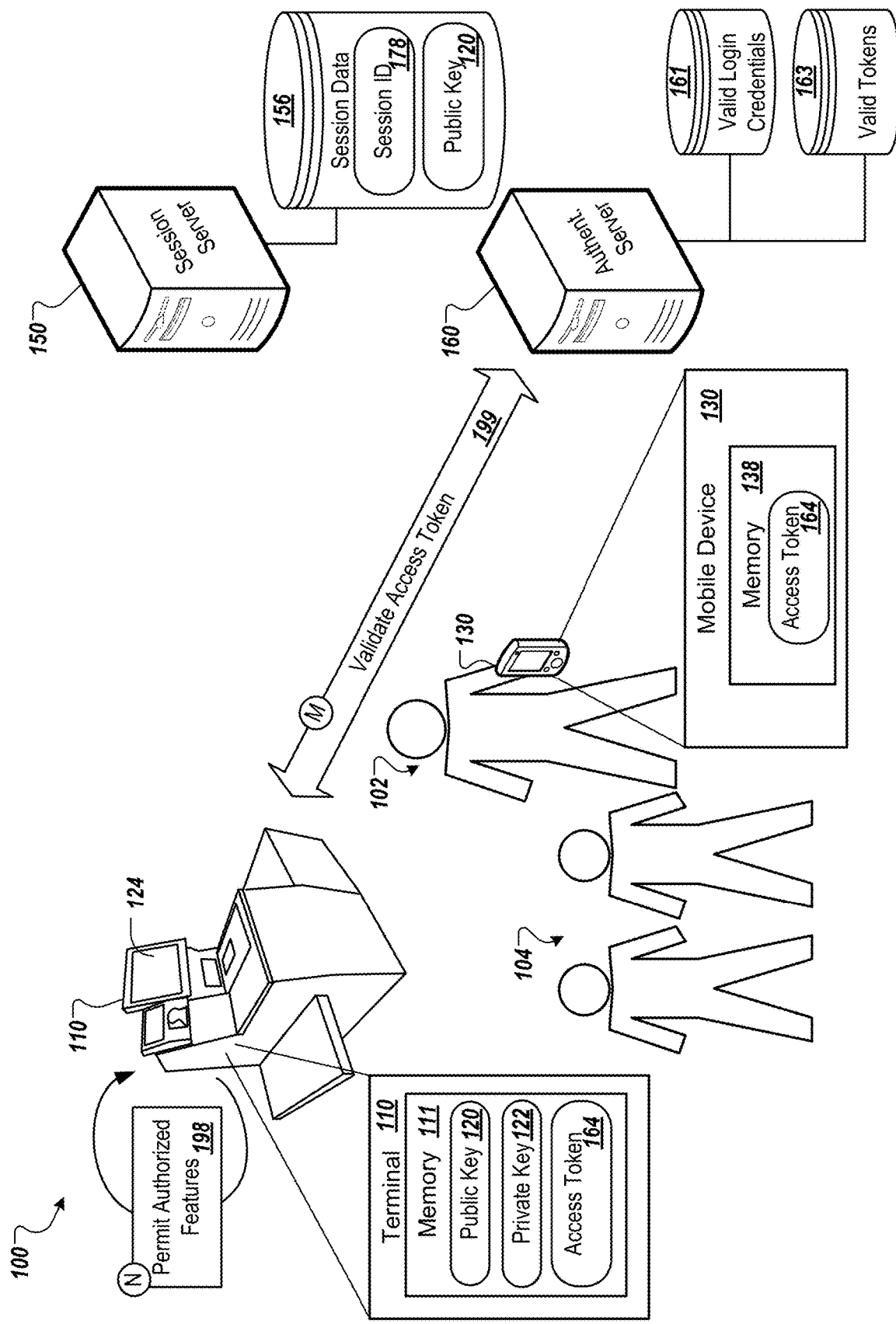

Referring to FIG. 1F, the POS terminal 110 can validate the access token 164 through communication with the authentication server 160, as indicated by step M (199). For example, the POS terminal 110 and/or the authentication server 160 can present one or more challenges to each other using the access token 164 (e.g., signing values using one or more values from the access token 164), and/or can securely share the access token 164, which can be validated using the values stored in the valid token repository 163. Additional and/or alternative techniques for validating the access token 164 as transferred to and stored by the POS terminal 110 are also possible. Once validated, the POS terminal 110 can permit access to one or more authorized features on the POS terminal 110 (step N, 198), such as voiding transactions, processing returns or refunds, and/or performing other actions not available to the other individuals 104. The POS terminal 110 can also use the access token to call application programming interfaces (APIs) of various external systems (e.g., the session server 150, the authentication server 160, and other external systems).

Figure 2A:
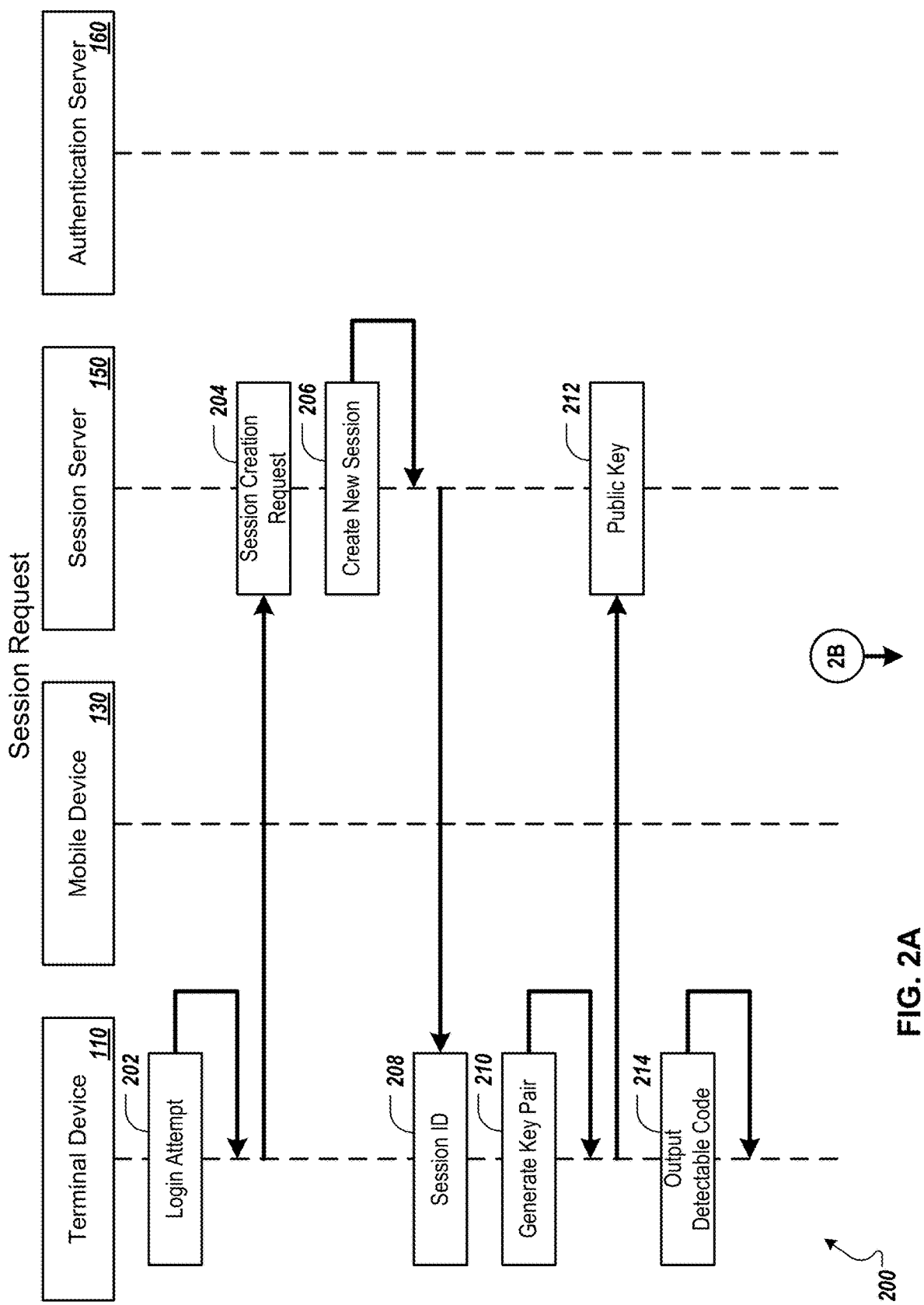
FIGS. 2A-2C is a sequence diagram of an example technique for securely transferring access credentials.
Figure 2B:
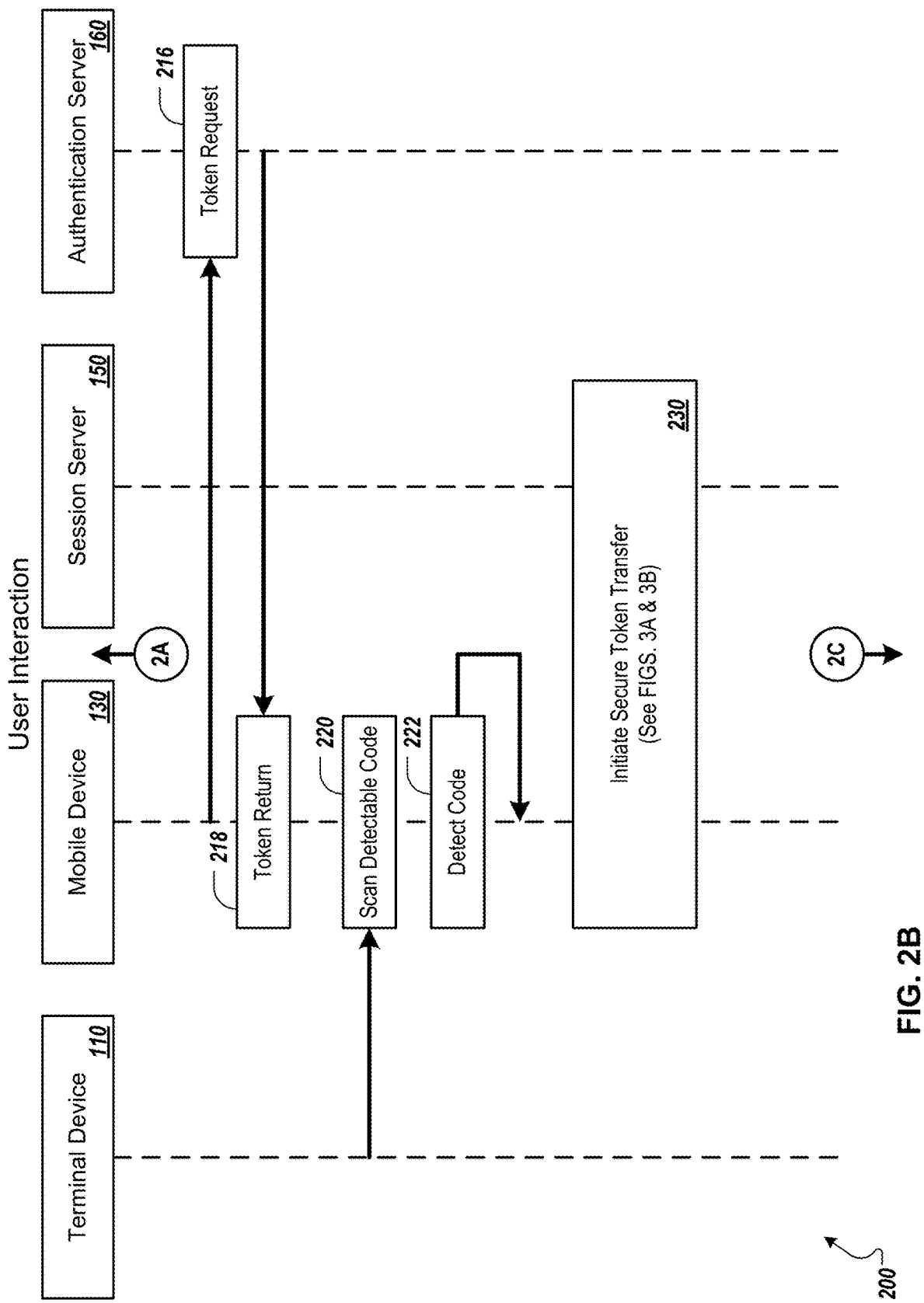
Figure 2C:
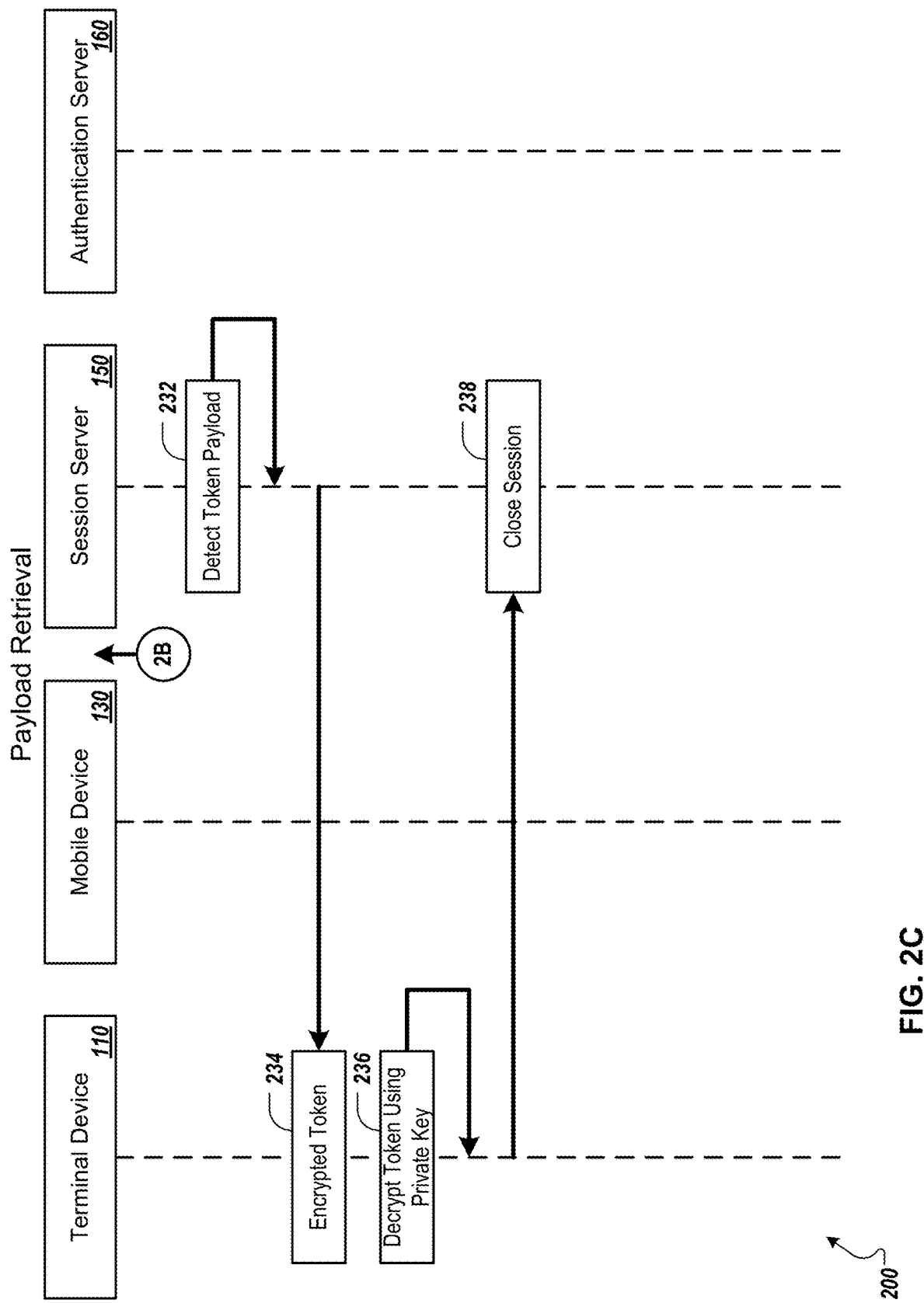

Referring now to FIGS. 2A-2C, a sequence diagram of an example technique 200 for securely transferring access credentials is shown. In the present example, the technique 200 can be performed by the components of the system 100, and will be described with reference to FIG. 1A. However, other systems may be used to perform the same or a similar process. The various operations of the technique 200 may occur in the illustrated sequence, or they may occur in a sequence that is different than in the illustrated sequence, and/or two or more of the operations may be concurrent. In some examples, one or more of the operations may be repeated multiple times during a process for transferring access credentials.

Referring to FIG. 2A (which generally shows operations for handling a session request), at 202 a login attempt is initiated at the terminal device 110. In general, the terminal device 110 can be left unattended for periods of time, and by default can present a login screen to indicate that the device is ready for a user login and the initiation of a new session. A user can then interact with an interface of the terminal device 110 (e.g., by selecting a login initiation control presented by the interface) to request that a login process be initiated. For implementations in which the terminal device 110 is an information kiosk, for example, a user can initiate the login process such that the device 110 can begin a customized session for the user. For implementations in which the terminal device 110 is a worker-operated point of sale device, for example, a worker who is ending a shift can log out of the device 110, and another worker who is starting a shift can log in to the device, such that transactions that occur during the shift are attributed to the logged-in worker. For implementations in which the terminal device 110 is a self-checkout point of sale device, for example, a customer can initially be using the device 110, and a worker can be notified to assist the customer with a problem that has occurred. The worker can then initiate the login process to access functions of the terminal device 110 in order to assist the customer.

At 204, the terminal device 110 provides a session creation request for the session server 150. In response to the user interaction with the interface of the terminal device 110 (e.g., a selection of the login initiation control), for example, the terminal device 110 can use the session manager 116 to execute code that transmits the session creation request to the session server 150 over the network(s) 170. For example, each terminal device 110 in a building (e.g., a store, a transit center, etc.) or another sort of defined area can maintain an address (e.g., a network address, an Internet address, etc.) of the session server 150, and can transmit session creation requests to the session server 150, which is configured to create and to concurrently maintain independent sessions for each terminal device 110.

At 206, the session server 150 creates a new session. In response to receiving the session creation request from the terminal device 110, for example, the session server 150 can use the session generator 152 to create a new session between the terminal device 110 and the session server 150. In some implementations, a session can include a secure communication channel between a session server and a terminal device. For example, the session manager 116 of the terminal device 110 and the session generator 152 of the session server 150 can use an application programming interface (API) to open an interactive communication session (e.g., using a web socket) between the terminal device 110 and the session server 150, through which data can be transmitted and received without polling. The web socket, for example, can provide a degree of security (e.g., transport layer security (TLS)) for data being transmitted, such that a possible listener on the secure communication channel is unable to decipher the data.

At 208, the session server 150 provides a session identifier for the terminal device 110. For example, as part of opening the interactive communication session (e.g., the web socket), the session server 150 can generate a unique session identifier that distinguishes the newly created session with the terminal 110 from other sessions with other terminals. In some implementations, a session identifier can be a randomly generated identifier. For example, the session server 150 can use the session generator 152 to generate a universally unique identifier (UUID) that is non-sequential and non-guessable. The UUID, for example, can be an alphanumeric string (e.g., of 36 characters or another suitable length) that is highly likely to be globally unique. The session identifier can be ephemeral, for example, in that the session identifier can be generated, used, and then discarded after use (e.g., after the session between the terminal device 110 and the session server 150 is closed).

In some implementations, a mailbox architecture can be used for a communication channel between a terminal device and a session server. For example, rather than establishing an interactive communication session between the terminal device 110 and the session server 150, the server 150 can create a digital mailbox at the server 150 that is identified by a mailbox identifier (e.g., analogous to the session identifier). After the digital mailbox has been created, for example, data can be exchanged between the session server 150 and each of the terminal device 110 and the mobile device 130, through the digital mailbox and through the use of polling techniques by intended data recipients.

At 210, the terminal device 110 generates a key pair including a corresponding public key and private key. For example, the terminal device 110 can use the key pair generator 112 to generate the key pair including the corresponding public key 120 and private key 122. The key pair, for example, can be an asymmetric key pair (e.g., a Rivest-Shamier-Adleman (RSA) key pair, or another suitable asymmetric key pair) in which a public key is published and is used for encryption, while the related private key is kept secret and is used for decryption.

At 212, the terminal device 110 transmits a generated public key to the session server 150. For example, the terminal device 110 can use the session manager 116 to securely transmit the public key 120, over the previously established secure communication channel that corresponds to the session identifier received from the session server. Upon receiving the public key 120, for example, the session server 150 can store the public key 120 in association with the session identifier for subsequent use in encrypting payloads intended for the terminal device 110. The terminal device 110, for example, can store the private key 122 locally for subsequent use in decrypting payloads from the session server 150 that have been encrypted with the public key 120. By employing an additional layer of security (e.g., asymmetric encryption) in addition to the security provided by the communication channel established between the terminal device 110 and the session server 150, for example, payload data can be secured both in transit and at rest (e.g., the payload data is not being stored in clear text when the data is being maintained at the session server 150). Further, if a malicious actor were to obtain the payload data by somehow accessing the communication channel or the session server 150, for example, the malicious actor would be unable to decrypt the data since the private key remains at the terminal device 110.

At 214, the terminal device 110 outputs a detectable code corresponding to the session identifier, in a format that is configured for detection by the mobile device 130. For example, the terminal device 110 can present the login interface 124 that includes instructions for a user of the mobile device 130 to initiate a detection of the detectable code 126 (e.g., which is based on the session identifier that had previously been received by the terminal device 110 from the session server 150, or a corresponding code that is related to the session identifier) that is currently being output by the terminal device 110. In some implementations, outputting a detectable code can include displaying the code as a scannable code. For example, terminal device 110 can use the code output generator 118 to generate a graphical representation of the session identifier (or a related code) for display at the login interface 124. In the present example, the detectable code 126 displayed at the login interface 124 can be a scannable barcode (e.g., a one-dimensional barcode, a two-dimensional quick-response (QR) code, or another sort of scannable code) that is configured to be detected by an optical detection unit (e.g., a camera, a laser scanner, etc.) of the mobile device 130. In some implementations, outputting a detectable code can include transmitting the code as a wireless signal. For example, the terminal device 110 can use the code output generator 118 to generate a wireless transmission (e.g., using near-field communication (NFC) or another suitable short-range wireless protocol) that represents the detectable code for detection by a wireless communication unit of the mobile device 130.

In some implementations, a detectable code can be periodically updated, and login interface output can be refreshed to reflect a most recent detectable code. For example, the session server 150 can periodically (e.g., once every thirty seconds, once every minute, once every two minutes, or at another suitable frequency) generate a new session identifier (e.g., as part of establishing a new secure communication channel between the session server 150 and the terminal device 110), and can provide the newly generated session identifier to the terminal device 110. In turn, the terminal device 110 can refresh its login interface 124, for example, and can output an updated detectable code 126 that is based on the newly generated session identifier. As another example, the session identifier can remain constant (e.g., serving as a connection identifier), and a corresponding code (e.g., being separate from the session identifier linked to the session identifier, and serving as a basis for a detectable code) can be periodically updated. A link between the session identifier and the updated corresponding code, for example, can be maintained by the session server 150. The updated corresponding code can then be transmitted to the terminal device 110, which can refresh its login interface 124 to output the updated detectable code 126 that is based on the updated corresponding code. In either example, the data relationship between the session server 150 and the terminal device 110 can be maintained while preventing possible replay attacks that could arise from outputting a detectable code that is based on a static session identifier (or a static corresponding code) at a terminal for an extended period of time.

In the present example, the secure communication channel has been established between the terminal device 110 and the session server 150, and the terminal device 110 is now ready to receive access credentials of the mobile device 130 of the user who initiated the login attempt (e.g., at 202). For example, the user of the mobile device 130 may currently be logged in to the device 130 while performing operations for an organization (e.g., as a worker for a store or another sort of organization), and may want to access the terminal device 110. In this scenario, the user of the mobile device 130 can simply use the device 130 to access a device function (e.g., the scanning of a detectable code) for initiating an automated and secure transfer of the user's access credentials (e.g., token-based credentials) from the mobile device 130 to the terminal device 110. As another example, the user of the mobile device 130 may not be currently logged in to the device 130, but may want to access the terminal device 110. In this scenario, the user of the mobile device 130 can provide login information in order to log in to the device 130 (which is expected to be with the user while performing operations for the organization and not to be left unattended), and then access the device function for initiating the automated and secure transfer of the user's access credentials from the mobile device 130 to the terminal device 110. The automated and secure transfer of credentials may be preferable to a manual login process for the terminal device 110, for example, in which a malicious actor can observe the user as login information is being entered at device 110, and in which the malicious actor can potentially use the login information to access the device 110 (or another terminal device of an organization) at a later time. Further, by leveraging the login process of the mobile devices, unattended or misplaced devices can be remotely deactivated and disabled, preventing malicious actors for acquiring the devices and using the devices to access terminal devices.

Referring now to FIG. 2B (which generally shows operations for handling user interactions with a mobile device and a detectable code of a terminal device), providing access credentials (e.g., one or more access tokens) to the mobile device 130 will initially be described. For example, if a user is not currently logged in to the mobile device 130, the user can provide login credentials (e.g., a user name and password, a personal identification number (PIN), biometric data, etc.) through a mobile device login interface (not shown) of the mobile device 130. After receiving the login credentials, at 216 the mobile device 130 can use the login manager 134 to transmit an access token request to the authentication server 160, including the login credentials of the user of the mobile device 130. The authentication server 160, for example, can process the access token request, including verifying whether the login credentials correspond to an authorized user, and if so, returning the access credentials of the user (e.g., the one or more access tokens) to the mobile device 130. At 218, the mobile device 130 receives the access token 164 (e.g., representing both a user access token and a user identification token) returned from the authentication server 160. The access token 164, for example, can be used to sign into devices and servers in the system 100 that trust the authentication server 160 (e.g., including both the mobile device 130 and the terminal device 110). In general, once the mobile device 130 receives access credentials (e.g., the access token 164) from the authentication server 160, features of the device 130 can be enabled until the user logs out, a timeout condition occurs (e.g., due to user inactivity), or another sort of event occurs that signifies that the device 130 is to be disabled.

After receiving the access credentials (e.g., either at a time before the login attempt 202 at the terminal device 110 had been initiated, or afterwards), functions of the mobile device 130 can be activated, and a user can trigger a process for transferring the access credentials from the mobile device 130 to the terminal device 110, by scanning a detectable code. At 220, for example, the mobile device 130 scans the detectable code 126 (e.g., which includes the session identifier or another code that corresponds to the session identifier) being presented at the terminal device 110. For example, the user of the mobile device 130 can interact with the terminal login interface 140 of the device 130 (e.g., by selecting a physical or virtual control 142) to trigger a detection of the detectable code 126 (e.g., a scannable barcode, a wirelessly transmitted code, or another sort of detectable code 126) being presented by the corresponding login interface 124 of the terminal device 110.

At 222, the mobile device 130 detects the detectable code 126. For example, the mobile device 130 can use the code detector 132 (e.g., including computer instructions of a code handling service) to detect and parse the detectable code 126 that is being presented. In some implementations, after scanning a detectable code, a mobile device can identify a code type, and can perform an action based at least in part on the type of code. For example, the detectable code 126 can be formatted (e.g., using a uniform resource identifier (URI) format or another suitable format) to include a string that identifies the code as being related to an access credential transfer function, and to include an identifier of the active session between the terminal device 110 and the session server 150 (e.g., the session identifier or another code that corresponds to the session identifier). In the present example, the mobile device 130 can initiate a secure transfer of its access token 164 to an address of the session server 150 that corresponds to the active session, based on the information extracted from the scanned detectable code 126. By limiting the information included in the detectable code 126 to code type identifiers and session identifiers (or corresponding identifiers), for example, malicious actors are unable to leverage the information to obtain access tokens or to perform other malicious activities.

In some implementations, after identifying a detectable code as having a code type that is related to an access credential transfer function, a mobile device can alert a user of the mobile device that such a detectable code has been scanned. For example, the mobile device 130 can present a confirmation interface (e.g., including an "allow" control and a "cancel" control) in response to detecting a scan of the detectable code 126. If a user of the mobile device 130 were to select the "allow" control, for example, the automated login process may continue, whereas if the user were to select the "cancel" control, the process can be terminated. By providing the confirmation interface in response to a detection of the access credential transfer function code type, for example, replay attacks can be thwarted in which malicious actors work in tandem to socially engineer the scanning of a replayed detectable code by user of the mobile device 130. For example, a first malicious actor could potentially capture an image of a detectable code presented by a terminal device (e.g., with a personal mobile device), and then send the captured image to a personal device of a second malicious actor who requests that the user of the mobile device 130 scan the code (e.g., by purporting that the captured image is a different type of code, such as a product code). If such a scenario were to occur, for example, the user of the mobile device 130 would be alerted to the deception through the confirmation interface, which would normally be presented in response to automated login attempts.

At 230, a series of interactions are performed between the mobile device 130 and the session server 150 to initiate a secure token transfer for transferring access credentials. As part of the series of interactions, for example, the access token 164 of the mobile device 130 can be encrypted using the public key 120 that had previously been generated by the terminal device 110 (e.g., at 210) and transmitted to the session server 150 (e.g., at 212). As will now be described with respect to the example techniques 300 (shown in FIG. 3A) and 350 (shown in FIG. 3B), the encryption of the access token 164 with the public key 120 can performed by either the mobile device 130 or the session server 150.

In general, in response to detecting the detectable code 126, an access token payload (e.g., either including an unencrypted access token or an encrypted access token) can be transmitted by the mobile device 130 to the session server 150 in association with the detectable code 126 over a secure communication channel that is established between the mobile device and the session server (e.g., using transport layer security (TLS) or another suitable protocol). The mobile device 130, for example, can identify the session server 150 through a configuration setting (e.g., a preconfigured endpoint setting that specifies the session server 150) or through dynamic detection. When communicating with the session server 150 over the secure communication channel, for example, the mobile device 130 can reference an identifier (e.g., the session identifier or a corresponding identifier) extracted from the detectable code 126, and can transmit the access token payload (or other data) over the secure communication channel in association with the identifier extracted from the detectable code 126. Upon receiving the access token payload (or other data) over the secure communication channel, for example, the session server 150 can determine the active session (e.g., the web socket) to which the token payload (or other data) pertains, by referencing the identifier of the session received in association with the token payload (or other data).

Figure 3A:
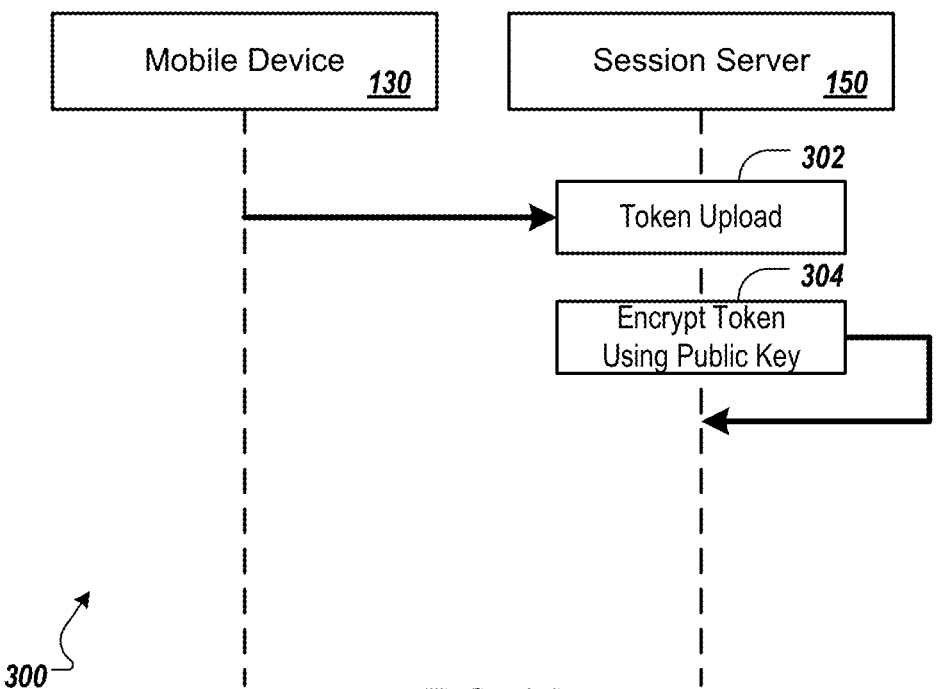
FIGS. 3A and 3B are sequence diagrams of example techniques for encrypting and uploading tokens when transferring access credentials.

Referring now to FIG. 3A, a sequence diagram of an example technique 300 is shown for uploading and encrypting an access token when transferring access credentials. The technique 300, for example, can include performing an encryption of the access token 164 with the public key 120 by the session server 150. In the present example, the technique 300 can be performed by the components of the system 100, and will be described with reference to FIG. 1A.

At 302, an access token is uploaded from the mobile device 130 to the session server 150. For example, the mobile device 130 can add its access token 164 to an access token payload, and can upload the access token payload to the session server 150 over the secure communication channel using the techniques described above. Upon receiving the access token payload from the mobile device 130, at 304 the access token 164 can be extracted from the access token payload, and can be encrypted by the session server 150 using a public key. For example, the session server 150 can use the cryptography module 154 to encrypt the access token 164 with the public key 120 that had previously been provided by the terminal device 110. In the present example, while the access token 164 is in an encrypted state during transmission from the mobile device 130 to the session server 150, the token briefly exists at the server 150 in plaintext, before it is encrypted at the server 150. In other examples, to provide an additional layer of security (and as described with respect to the example technique 350 of FIG. 3B), the access token 164 can be encrypted at the mobile device 130.

Figure 3B:
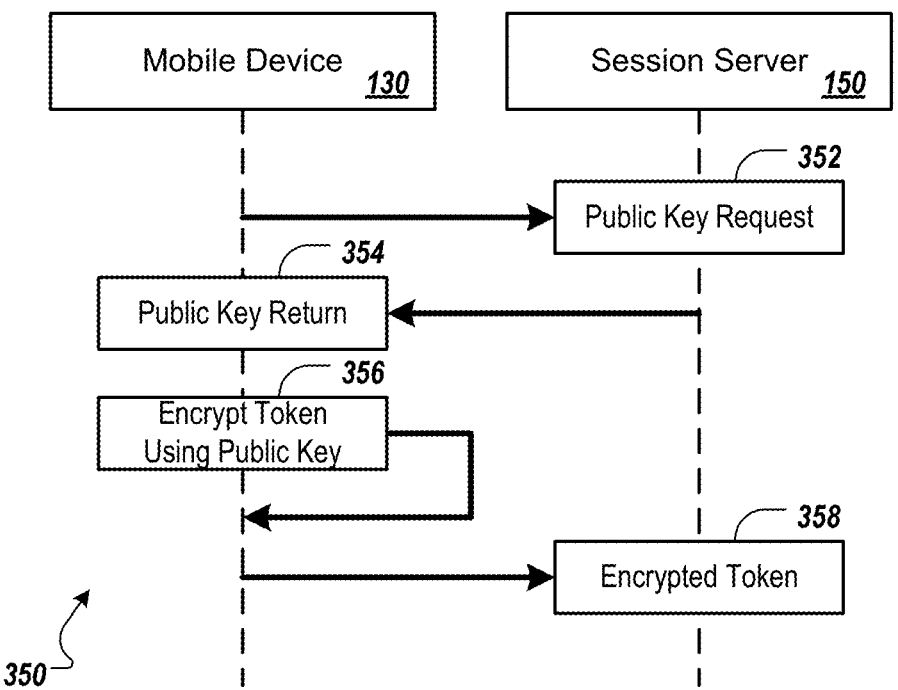

Referring now to FIG. 3B, a sequence diagram of an example technique 350 is shown for encrypting and uploading an access token when transferring access credentials. The technique 350. For example, can include performing an encryption of the access token 164 with the public key by the mobile device 130. In the present example, the technique 300 can be performed by the components of the system 100, and will be described with reference to FIG. 1A.

At 352, the mobile device 130 provides a public key request to the session server 150. For example, the mobile device 130 can transmit the public key request to the session server 150 over the secure communication channel using the techniques described above. Upon receiving the public key request, at 354 the public key 120 corresponding to the request is identified by the session server 150 (e.g., by referencing the identifier of the session received in association with the public key request), and the public key 120 is returned to the mobile device 130. Upon receiving the public key 120 returned from the session server 150, at 356 the mobile device 130 can use the cryptography module 136 to encrypt its access token 164 using the public key 120. At 358, the encrypted access token is added to an access token payload and is uploaded from the mobile device 130 to the session server 150 over the secure communication channel using the techniques described above. In the present example, the access token 164 arrives at the session server 150 in an encrypted state, thus providing an additional layer of security, albeit at the expense of additional communication overhead and additional system complexity.

In some implementations, generating an encrypted access token can include encrypting an access token using a symmetric key, and encrypting the symmetric key using a public key. For example, either the mobile device 130 or the session server 150 can generate the symmetric key, and can encrypt the access token 164 using the generated symmetric key (e.g., using advanced encryption standard (AES), or another suitable symmetric encryption technique). After encrypting the access token 164 using the symmetric key, for example, the symmetric key itself can be encrypted (e.g., by the same device or server that generated the symmetric key) using the public key 120 that had been generated by the terminal device 110 and transmitted to the session server 150 (and optionally, forwarded to the mobile device 130). After encryption of the access token 164 and the symmetric key has been performed, for example, the encrypted symmetric key can be transmitted along with the encrypted access token 164 (e.g., included in an access token payload). Decrypting the encrypted access token 164 by the terminal device 110 (e.g., at 236 below) can include decrypting the encrypted symmetric key using the stored private key 122, then decrypting the encrypted access token 164 using the decrypted symmetric key. By using a symmetric encryption protocol (e.g., AES) to encrypt the access token 164, and an asymmetric encryption protocol (e.g., RSA) to encrypt the symmetric key, for example, larger amounts of data can be encrypted (e.g., the amount of data in an access token), while leveraging the security benefit of public/private key pair cryptography.

After performing the process to initiate a secure token transfer (e.g., using either the example technique 300 shown in FIG. 3A, or the example technique 350 shown in FIG. 3B), an access token payload including an encrypted access token 164 can exist at the session server 150. Referring now to FIG. 2C (which generally shows operations for handling an access token payload retrieval), at 232, the session server 150 detects a token payload. For example, the session server 150 can detect that a token payload including the encrypted access token 164 of the mobile device 130 is ready for transmission to the terminal device 110. In some implementations, detecting that a token payload is ready for transmission to a mobile device can include receiving a notification from a listener of a token payload repository. For example, the session server 150 can include an instance of a service for handling access credential transfer requests (e.g., or multiple instances, for redundancy). After receiving the token payload, for example, the session server 150 can store the token payload at a data repository that is accessible by the instance of the service, can use the listener to detect that the token payload is available for transmission to a corresponding terminal device, and can broadcast a notification (e.g., including the identifier of the session from the detectable code 126) to the instance of the service that the token payload is available. Upon receiving the notification, for example, the instance can determine whether an open session with a terminal exists that corresponds to the identifier of the session, and if so, can retrieve the corresponding token payload from the repository.

At 234, the session server 150 transmits the encrypted access token 164 to the terminal device 110. For example, the session server 150 can identify the secure transmission channel that corresponds to the identifier of the session (e.g., from the detectable code 126), and can transmit a token payload including the encrypted access token 164 to the terminal device 110, over the secure transmission channel. Optionally, after transmitting the token payload including the encrypted access token 164, the encrypted access token 164 and the public key 120 can be removed from the session server 150. As another option, the encrypted access token 164 and the public key 120 can be maintained until the session with the terminal device 110 is complete.

At 236, the terminal device 110 decrypts the access token using the private key 122. For example, the terminal device 110 can use the cryptography module 114 to decrypt the encrypted access token 164 with the private key 122 that corresponds to the public key 122. In some implementations, after decrypting an access token, the access token can be validated. For example, the terminal device 110 can determine whether the decrypted access token 164 is a valid, unexpired access token. If the access token 164 is invalid or expired, for example, the terminal device 110 can provide a notification informing a user that the login attempt is unsuccessful, and can restart the process for transferring access credentials. If the access token 164 is valid and unexpired, for example, the login attempt is successful, and the user can begin using functions of the terminal device 110 according to access rights associated with the access token 164.

At 238, after performing the validation process on the access token 164 that has been provided by the session server 150, for example, the terminal device 110 closes the session with the session server 150. After the session has been closed, for example, the session server 150 can use garbage collection techniques to recover system resources that had been used by the secure communication channel of the session, and the terminal device 110 can remove the public key 120 and the private key 122 from the device 110. Further, after the user has finished using the terminal device 110 (e.g., by logging out), the access token 164 can be removed from the device 110.

Figure 4:
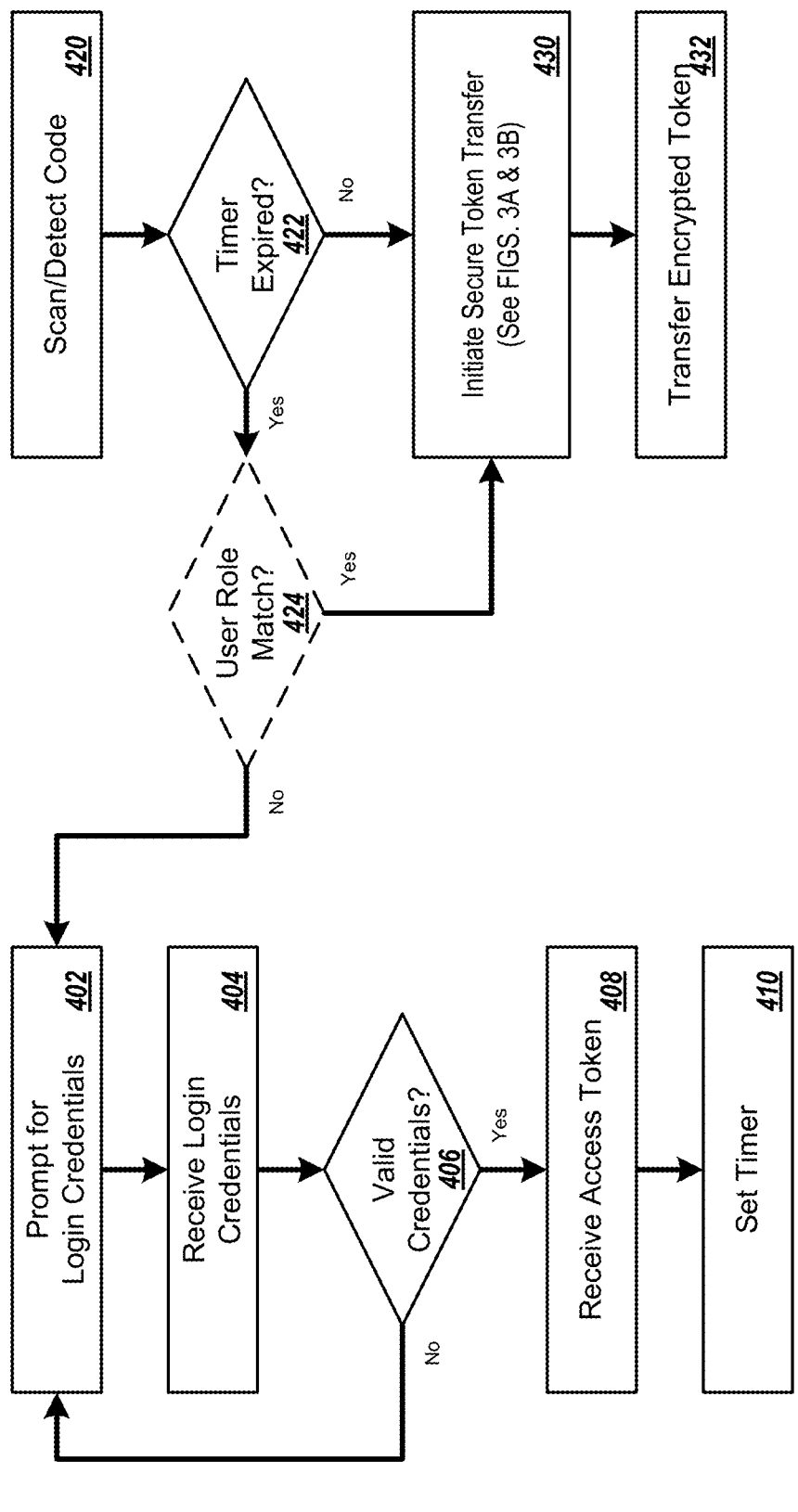
FIG. 4 is a flow diagram of an example technique for securing a mobile computing device when transferring access credentials.

Referring now to FIG. 4, a flow diagram of an example technique 400 is shown for securing a mobile computing device when transferring access credentials. In the present example, the technique 400 can be performed by the components of the system 100, and will be described with reference to FIG. 1A. However, other systems may be used to perform the same or a similar process. The various operations of the technique 400 may occur in the illustrated sequence, or they may occur in a sequence that is different than in the illustrated sequence, and/or two or more of the operations may be concurrent. In some examples, one or more of the operations may be repeated multiple times when transferring access credentials.

At 402, a prompt for login credentials is provided. For example, the mobile device 130 can use the login manager 134 to provide a mobile device login interface (not shown) that prompts the user of the device for login credentials (e.g., a user name and password, a personal identification number (PIN), biometric data, etc.). The user can then provide the login credentials to the mobile device 130 through the login interface.

At 404, login credentials are received. For example, the mobile device 130 can use the login manager 134 to receive the user's login credentials through the mobile device login interface. In turn, the mobile device 130 can provide the login credentials to the authentication server 160, which receives the login credentials from the mobile device 130.

At 406, a determination is performed of whether the login credentials are valid. For example, the authentication server 160 can verify whether the received login credentials correspond to an authorized user. If not, the authentication server 160 can return a notification to the mobile device 130 that indicates that the login process is unsuccessful, and the mobile device 130 can in turn provide the notification to the user of the device 130. If the credentials do correspond to an authorized user, the authentication server 160 can retrieve authentication credentials (e.g., the access token 164) that correspond to the login credentials of the user, and can provide the retrieved authentication credentials to the mobile device 130.

At 408, an access token is received. For example, the mobile device 130 can receive the access token 164 from the authentication server 160. After receiving the access token 164, for example, the mobile device 130 can provide device functions to the device user that correspond to the access rights defined in the access token 164.

At 410, a timer is set. For example, the mobile device 130 can use the login manager 134 to maintain a timer that corresponds to a last successful login that had occurred using the device 130 (e.g., either a login to the mobile device 130 that occurred through the mobile device login interface or a login to the terminal device 110 that was facilitated by the mobile device 130 through the terminal login interface 140). The timer, for example, can run continually as an operator of the mobile device 130 uses the device 130, or as the device is potentially left unused.

At 420, a code is scanned and detected. Similar to operation 220 and 222 (shown in FIG. 2B), for example, the mobile device 130 can scan the detectable code 126 being presented at the terminal device 110, and can detect the code 126. For example, a user of the mobile device 130 may want to access the terminal device 110, and thus can perform interactions to attempt a transfer of the user's access token 164 from the mobile device 130 to the terminal device 110 by scanning the detectable code 126.

At 422, a determination is performed of whether the timer has expired. For example, the mobile device 130 can reference the running timer (e.g., that had been initiated during a most recent successful login), and can determine whether an amount of time indicated by the timer meets a timeout threshold (e.g., fifteen minutes, a half hour, an hour, or another suitable threshold value). If the amount of time indicated by the timer exceeds the timeout threshold, for example, the mobile device 130 can determine that the timer is expired, whereas if the amount of time indicated by the timer does not exceed the timeout threshold, the mobile device 130 can determine that the timer is not expired.

If the timer has not expired, for example, the mobile device 130 can perform operations 430 for initiating a secure token transfer (e.g., similar to the operations 230 referenced in FIG. 2B and shown in FIGS. 3A and 3B). Subsequently, operations 432 can be performed for transferring the user's access token 164 in an encrypted state to the terminal device 110 (e.g., as shown in FIG. 2C), for decryption by the device 110. After the operations have been completed and the decrypted access token 164 has been validated by the terminal device 110, for example, the user can begin using the terminal device 110.

However, if the timer has expired, for example, at 424 a determination is performed of whether a user role match is present. For example, the user's authentication credentials (e.g., the access token 164) can include information related to the user's role within an organization. Some users may have roles that are associated with frequent expected use of terminal devices (e.g., workers who are trained to assist customers with self-checkout point of sales devices in a store), whereas other user may have roles that are associated with infrequent expected use of terminal devices (e.g., workers who are trained to perform inventory-related functions in the store). The mobile device 130, for example, can determine a type of role of a logged-in user (e.g., by referencing user role information in the access token 164), and can determine whether the user's role type matches a list of role types that are associated with frequent expected use of terminal devices.

If a user role match does not exists (e.g., the logged-in user's role type does not match a role type that is associated with frequent expected use of terminal devices), for example, a prompt for login credentials can again be provided (e.g., at 402). For example, the mobile device 110 can prompt the user to again log in to the device 110 using the mobile device login interface (not shown). By prompting the user for another login, for example, security can be maintained in an organization, in the event of a mobile device being left unattended by a worker who does not frequently use the device to facilitate terminal logins. Further, login information that is manually entered at a mobile device is less likely to be observed and harvested by a malicious actor than login information that is manually entered at a terminal device, since use of the mobile device can be more easily be kept private.

If a user match does exist (e.g., the logged-in user's role type does match a role type that is associated with frequent expected use of terminal devices), for example, the mobile device 130 can perform operations 430 for initiating a secure token transfer, and subsequent operations 432 can be performed for transferring the user's access token 164 in an encrypted state to the terminal device 110, for decryption by the device 110. After the operations have been completed and the decrypted access token 164 has been validated by the terminal device 110, for example, the user can begin using the terminal device 110. In bypassing the timer for particular types of users (e.g., workers who frequently use the device to facilitate terminal logins), efficiency of the login process can be maintained. Although the operations for maintenance of the timer and the determination of user role matches has been described as occurring at the mobile device 130, in some implementations, one or both operations can occur at a server that is remote from the device 130 (e.g., the authentication server 160 and/or the session server 150).

Figure 5:
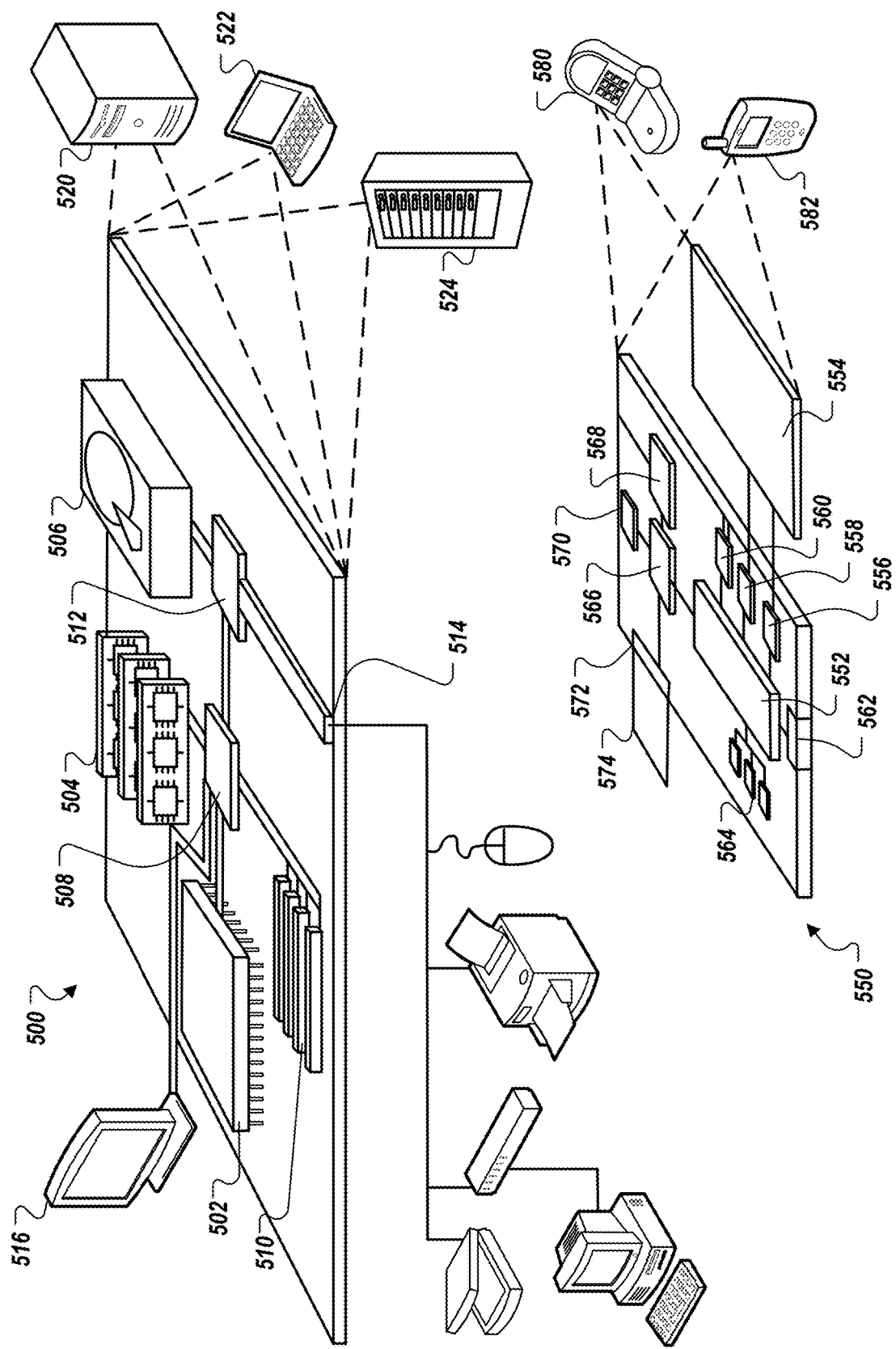
FIG. 5 is a schematic diagram that shows an example of a computing device and a mobile computing device.

FIG. 5 shows an example of a computing device 500 and an example of a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, and a transceiver 568, among other components. The mobile computing device 550 can also be provided with a storage device, such as a micro-drive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provide as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer system for securely transferring access credentials from a mobile device that is exclusively operated by a single user, to a terminal device that is shared among multiple different users, via a session server, the system comprising:
   the mobile device;
   the terminal device; and
   the session server,
   wherein the mobile device, the terminal device, and the session sever each include one or more processors, memory, and storage devices storing respective instructions that, when executed, cause the respective mobile device, terminal device, and session server to perform operations comprising:
      transmitting, by the session server and to the terminal device over a secure communication channel, a session identifier of a session;
      generating, by the terminal device, a key pair comprising a private key and a public key;
      transmitting the public key, by the terminal device and to the session server over the secure communication channel, and storing, at the terminal device, the private key;
      outputting, by the terminal device, a detectable code corresponding to the session identifier, in a format that is configured for detection by the mobile device;
      detecting, by the mobile device, the detectable code that has been output by the terminal device;
      in response to detecting the detectable code, transmitting, by the mobile device and to the session server, an access token payload in association with the detectable code;
      transmitting, by the session server and to the terminal device over the secure communication channel, an encrypted access token that has been encrypted using the public key that had previously been transmitted by the terminal device;
      decrypting, by the terminal device, the encrypted access token using the stored private key; and
      providing operator access to the terminal device.

2. The system of claim 1, the operations further comprising:
   transmitting, by the mobile device and to an authentication server, a request for an access token, wherein the request for the access token comprises login credentials of a user of the mobile device; and
   receiving the access token, by the mobile device and from the authentication in response to the request.

3. The system of claim 2, the operations further comprising:
   after receiving the access token, starting a timer for the mobile device;
   after starting the timer for the mobile device, detecting, by the mobile device, a scan of a detectable code that is being output by the terminal device;
   determining that the timer has expired; and
   in response to determining that the timer has expired, presenting, by the mobile device, a login interface for initiating another request for the access token from the authentication server.

4. The system of claim 1, the operations further comprising:
   receiving, by the session server and from the terminal device, a session creation request; and
   in response to receiving the session creation request, creating the session, by the session server, wherein the session comprises the secure communication channel between the session server and the terminal device.

5. The system of claim 1, the operations further comprising:
   generating, by the session server, the session identifier of the session, wherein the session identifier is a universally unique identifier.

6. The system of claim 1, the operations further comprising:
   periodically generating, by the session server, an updated code that corresponds to the session identifier;
   transmitting, by the session server and to the terminal device over the secure communication channel, the updated code; and
   outputting, by the terminal device, an updated detectable code that corresponds to the session identifier, in a format that is configured for detection by the mobile device.

7. The system of claim 1, wherein transmitting the access token payload comprises transmitting the access token payload to an address at the session server that corresponds to the detectable code.

8. The system of claim 1, the operations further comprising:
   adding, by the mobile device, an access token of the mobile device to the access token payload;
   after receiving the access token payload, extracting, by the session server, the access token from the access token payload; and
   encrypting, by the session server and using the public key that had previously been transmitted by the terminal device, the access token to generate the encrypted access token.

9. The system of claim 1, the operations further comprising:
   receiving, by the session server and from the mobile device, a request for the public key that had previously been transmitted by the terminal device;
   in response to the request for the public key, transmitting, from the session server and to the mobile device, the public key;

after receiving the public key, encrypting, by the mobile device and using the public key, the access token to generate the encrypted access token; and adding, by the mobile device, the encrypted access token to the access token payload.

10. The system of claim 1, the operations further comprising:

generating the encrypted access token included in the access token payload, by (i) encrypting the access token using a symmetric key, and (ii) encrypting the symmetric key with the public key that had previously been transmitted by the terminal device; and transmitting, by the session server and to the terminal device over the secure communication channel, the encrypted symmetric key along with the encrypted access token;

wherein decrypting, by the terminal device, the encrypted access token using the stored private key comprises i) decrypting the encrypted symmetric key using the stored private key, and ii) decrypting the encrypted access token using the decrypted symmetric key.

11. A computer implemented method for securely transferring access credentials from a mobile device that is exclusively operated by a single user, to a terminal device that is shared among multiple different users, via a session server, the method comprising:

transmitting, by the session server and to the terminal device over a secure communication channel, a session identifier of a session;

generating, by the terminal device, a key pair comprising a private key and a public key;

transmitting the public key, by the terminal device and to the session server over the secure communication channel, and storing, at the terminal device, the private key;

outputting, by the terminal device, a detectable code corresponding to the session identifier, in a format that is configured for detection by the mobile device;

detecting, by the mobile device, the detectable code that has been output by the terminal device;

in response to detecting the detectable code, transmitting, by the mobile device and to the session server, an access token payload in association with the detectable code;

transmitting, by the session server and to the terminal device over the secure communication channel, an encrypted access token that has been encrypted using the public key that had previously been transmitted by the terminal device;

decrypting, by the terminal device, the encrypted access token using the stored private key; and providing operator access to the terminal device.

12. The computer implemented method of claim 11, further comprising:

transmitting, by the mobile device and to an authentication server, a request for an access token, wherein the request for the access token comprises login credentials of a user of the mobile device; and receiving the access token, by the mobile device and from the authentication in response to the request.

13. The computer implemented method of claim 12, further comprising:

after receiving the access token, starting a timer for the mobile device;

after starting the timer for the mobile device, detecting, by the mobile device, a scan of a detectable code that is being output by the terminal device;

determining that the timer has expired; and in response to determining that the timer has expired, presenting, by the mobile device, a login interface for initiating another request for the access token from the authentication server.

14. The computer implemented method of claim 11, further comprising:

receiving, by the session server and from the terminal device, a session creation request; and in response to receiving the session creation request, creating the session, by the session server, wherein the session comprises the secure communication channel between the session server and the terminal device.

15. The computer implemented method of claim 11, further comprising:

generating, by the session server, the session identifier of the session, wherein the session identifier is a universally unique identifier.

16. The computer implemented method of claim 11, further comprising:

periodically generating, by the session server, an updated code that corresponds to the session identifier;

transmitting, by the session server and to the terminal device over the secure communication channel, the updated code; and outputting, by the terminal device, an updated detectable code that corresponds to the session identifier, in a format that is configured for detection by the mobile device.

17. The computer implemented method of claim 11, wherein transmitting the access token payload comprises transmitting the access token payload to an address at the session server that corresponds to the detectable code.

18. The computer implemented method of claim 11, further comprising:

adding, by the mobile device, an access token of the mobile device to the access token payload;

after receiving the access token payload, extracting, by the session server, the access token from the access token payload; and encrypting, by the session server and using the public key that had previously been transmitted by the terminal device, the access token to generate the encrypted access token.

19. The computer implemented method of claim 11, further comprising:

receiving, by the session server and from the mobile device, a request for the public key that had previously been transmitted by the terminal device;

in response to the request for the public key, transmitting, from the session server and to the mobile device, the public key;

after receiving the public key, encrypting, by the mobile device and using the public key, the access token to generate the encrypted access token; and adding, by the mobile device, the encrypted access token to the access token payload.

20. The computer implemented method of claim 11, further comprising:

generating the encrypted access token included in the access token payload, by (i) encrypting the access token using a symmetric key, and (ii) encrypting the symmetric key with the public key that had previously been transmitted by the terminal device; and transmitting, by the session server and to the terminal device over the secure communication channel, the encrypted symmetric key along with the encrypted access token;

wherein decrypting, by the terminal device, the encrypted access token using the stored private key comprises i) decrypting the encrypted symmetric key using the stored private key, and ii) decrypting the encrypted access token using the decrypted symmetric key.

* * * * *